Figure 1:
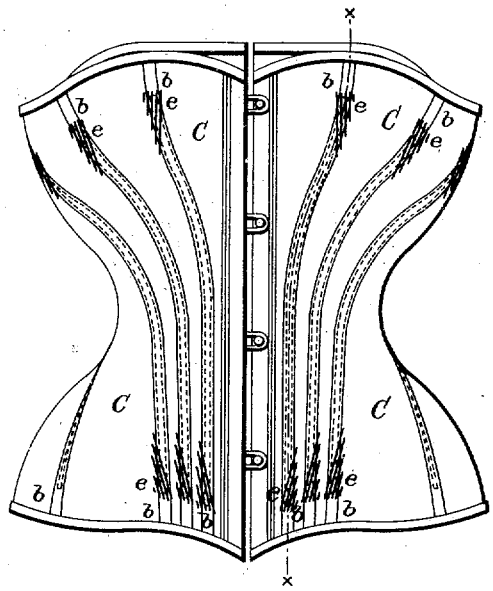

M. COHN.

CORSET.

No. 7,596. Reissued April 10, 1877.

WITNESSES.

Max H. Heinze

Philip F. Larner

INVENTOR.

Moritz Cohn

THE NORRIS PETERS CO., PHOTO-LITHO., WASHINGTON, D. C.

UNITED STATES PATENT OFFICE.

MORITZ COHN, OF NEW YORK, N. Y.

IMPROVEMENT IN CORSETS.

Specification forming part of Letters Patent No. 137,893, dated April 15, 1873; reissue No. 7,596, dated April 10, 1877; application filed February 28, 1877.

*To all whom it may concern:*

Be it known that I, MORITZ COHN, of the city, county, and State of New York, have invented certain new and useful Improvements in Corsets; and I do hereby declare that the following specification, taken in connection with the drawings making part of the same, is a full, clear, and exact description thereof.

From the circumstance that a corset is intended to conform to the shape of the human figure it is necessary that it should be enlarged by gores or triangular sections of fabric at certain places, so as to give sufficient fullness to the article where it covers the breasts and the hips of the wearer. It is also customary to furnish a corset with whalebones, or other flexible braces, to stay the article, and give a graceful contour to, and also support, the figure. These whalebones are inserted in tubular cases, which are either formed by weaving the fabric double at the proper places, or, in the case of hand-made corsets, are made by stitching onto a single fabric of cloth overlying strips of a suitable width to form bone-cases. These tubular cases are of two kinds, one of which I will call for distinction the "body-bone" cases, and the other "gore-bone" cases. The body-bone cases are those which are to contain the long bones, which extend nearly from edge to edge of the corset, and are located at the back, under the arms, and at the front of the article. The gore-bone cases are those which are to contain the short bones, which are to stiffen the gore portions of the corset, which cover the breasts and the hips, and they are necessarily closed at one end by the unavoidable intersection of the weft-threads in weaving such gore-shaped sections of the corset, and are of varying lengths limited by the shape of the gores to which they belong.

Previous to my invention it had been customary to weave the body-bone cases of a length extending from selvage to selvage, or, at least, if they stopped short of either selvage, with the ends of the cases left open. This method involves a great deal of hand labor, and, consequently, expense, from the fact that the body-bones ought to stop short of the upper edge of the corset, and it is desirable, too, that they should be of different lengths relatively to each other, and to the edge of the corset, in order that the article shall be comfortable to the wearer, and be easily adaptable to the figure, and if the bone-cases are too long or are open-ended it is necessary to locate the position for the ends of the bones, and then close up the tubular case at such places by hand-stitching, technically known in the art of making corsets as "fanning."

I propose, by my invention, to produce a corset in which the location or position of the bones endwise relatively to the edge of the corset after it has been cut to a pattern and finished shall be predetermined with the accuracy of the jacquard in the process of weaving the corset stuff or material, and I at the same time effect a great saving of labor and expense in retaining the bones in place by dispensing with the hand operation of fanning. My invention accomplishes, therefore, not only the production of corsets which are uniform in respect to the length of the bone passages, but also is attended with a reduction in the cost of manufacture; and my invention consists in making the closure of the pocket-like openings or passages into which the bones are to be put by the process of weaving the fabric, and at such points distant from the finished edge of the corset at which it is designed to have the end of each bone located.

To enable those skilled in the art to make and perfectly understand my invention, I will proceed to more fully describe it, referring by letters to the accompanying drawing, in which, for the purpose of illustration, I have represented two corsets, one made according to the mode of manufacture heretofore most generally practiced, the other according to my new method.

Figure 2:
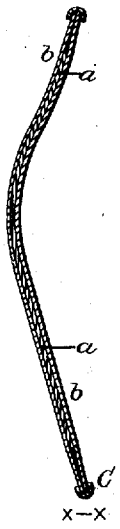

It will be seen by reference to Figures 1 and 2 that the bones *a* are held or secured in place endwise in the pockets *b* of the corset material C by stitching *e*, which is done after the insertion of the bone, and retains the bone endwise by closing up the passage-way or pocket in which it is located. This is in accordance with or illustrates the mode of manufacture originally practiced, and only departed from prior to my invention, as heretofore explained.

Figure 3:
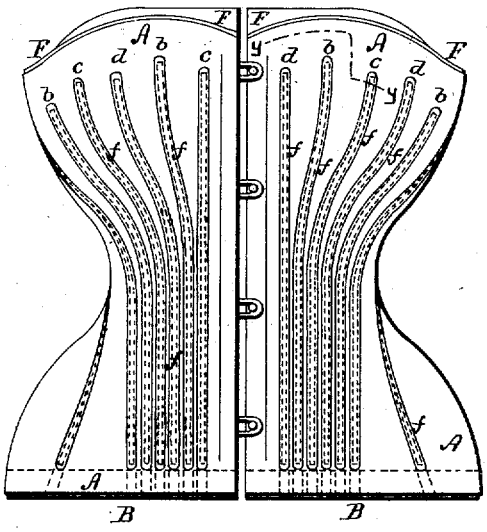
Figure 4:
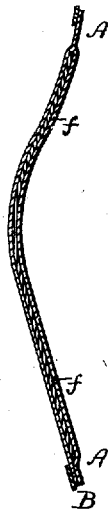
Figure 5:
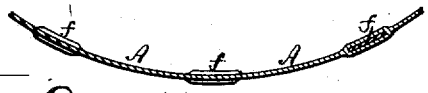

At Figs. 3, 4, and 5 is illustrated, in elevation and longitudinal and cross sections, a corset made according to my improved plan.

In these figures, A is the woven fabric of the corset, which, in lieu of being made with pocket-like openings or passages running through from edge to edge, or left with open ends, I weave with pockets or passages, which extend from one edge of the fabric toward the other, but stop short of the latter at such point or locality as is predetermined for the location of the end of each bone, according to the design or shape to be given to the corset, as shown. The fabric is woven with the pockets extending, as seen, from one edge, B, of the fabric to the points *b*, *c*, *d*, &c., and from these points out to the edge F the fabric is woven solid, or without any passages. *f f* represent the bones, which are made of the proper length, and are inserted from the edge B, or at the open ends of the pockets. After their insertion the bones are pushed "home" to the bottom of their respective pockets, when the mouths or open ends of the said pockets are closed up by the stitching and binding of the edge B of the corset, and the perfect retention of the bones thus effected.

It will thus be seen that, by forming the corset as described, with the body-bone pockets closed in the weaving, so as to indicate the location and effect the retention of the bones at predetermined places, I am enabled to determine in the manufacture of the corset-fabric the precise points to which the subsequently inserted bones shall extend, and thus pattern any number of corsets exactly alike, whereby the expense incident to hand fanning is avoided.

I am aware of and do not claim a hand-made corset with pockets of varying lengths stitched on; but What I do claim as new, and desire to secure by Letters Patent as a new manufacture, is—

1. A corset, the bone-passages of which have been closed in the weaving of the fabric at places predetermined by the jacquard, substantially as described.

2. The improvement in the mode of making corsets by closing one end of the bone-passages in the weaving at points predetermined for locating the ends of the bones, substantially as described.

MORITZ COHN.

Witnesses:
MAX W. HENIUS,
H. J. LEINKAUF.